US010611132B2

(12) United States Patent
Kobayashi et al.

(10) Patent No.: US 10,611,132 B2
(45) Date of Patent: Apr. 7, 2020

(54) POLYETHYLENE SEALANT FILM HAVING HIGH STRENGTH AND PACKAGE USING THE SAME

(71) Applicant: HOSOKAWA YOKO CO., LTD., Tokyo (JP)

(72) Inventors: Yukio Kobayashi, Tokyo (JP); Yohei Kageyama, Tokyo (JP); Munenori Miyazaki, Tokyo (JP); Yoshihiro Kojima, Kagawa (JP); Yoshikazu Tanaka, Kagawa (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 281 days.

(21) Appl. No.: 15/382,608

(22) Filed: Dec. 17, 2016

(65) Prior Publication Data
US 2017/0173928 A1 Jun. 22, 2017

(30) Foreign Application Priority Data

Dec. 17, 2015 (JP) ................................ 2015-246099

(51) Int. Cl.
B32B 27/08 (2006.01)
B32B 27/32 (2006.01)
B65D 65/40 (2006.01)
B29C 55/28 (2006.01)
B29C 48/08 (2019.01)
B29C 48/00 (2019.01)
B29C 48/21 (2019.01)
B32B 27/26 (2006.01)
B29K 23/00 (2006.01)
B29L 31/00 (2006.01)

(52) U.S. Cl.
CPC .......... B32B 27/32 (2013.01); B29C 48/0018 (2019.02); B29C 48/08 (2019.02); B29C 48/21 (2019.02); B29C 55/28 (2013.01); B32B 27/08 (2013.01); B32B 27/26 (2013.01); B32B 27/327 (2013.01); B65D 65/40 (2013.01); B29K 2023/0633 (2013.01); B29K 2995/0081 (2013.01); B29L 2031/712 (2013.01); B29L 2031/7128 (2013.01); B32B 2307/30 (2013.01); B32B 2307/31 (2013.01); B32B 2307/516 (2013.01); B32B 2307/54 (2013.01); B32B 2307/558 (2013.01); B32B 2439/40 (2013.01); B32B 2439/46 (2013.01); B32B 2553/00 (2013.01); B32B 2581/00 (2013.01)

(58) Field of Classification Search
CPC ....... B32B 27/32; B32B 27/327; B32B 27/08; B32B 2307/30; Y10T 428/31913; A61J 1/10; B29C 48/0018; B29C 48/08; B29C 48/21; B29C 55/28; B65D 65/40
USPC ............. 428/516, 34.9, 35.2, 35.7, 500, 515
See application file for complete search history.

(56) References Cited

U.S. PATENT DOCUMENTS

| 5,300,353 | A | * | 4/1994 | Yoshimura | B32B 27/08 428/213 |
| 5,434,010 | A | * | 7/1995 | Smith | C08F 210/16 428/34.9 |
| 5,604,297 | A | * | 2/1997 | Seiden | G01N 27/49 422/68.1 |
| 2001/0017431 | A1 | * | 8/2001 | Pip | B29C 48/08 264/172.19 |

FOREIGN PATENT DOCUMENTS

| JP | 2000062113 A | 2/2000 |
| JP | 2001114909 A | 4/2001 |
| JP | 2001162746 A | 6/2001 |
| JP | 2004-167956 A | 6/2003 |
| JP | 2006142685 A | 6/2006 |
| JP | 2006-181831 A | 7/2006 |

OTHER PUBLICATIONS

Robertson, Gordon L., Food Packaging: Principles and Practice, Third Addition, 2013, CRC Press, Boca Raton, p. 278 (Year: 2013).*

* cited by examiner

Primary Examiner — Lee E Sanderson
(74) Attorney, Agent, or Firm — Cermak Nakajima & McGowan LLP; Shelly Guest Cermak

(57) ABSTRACT

In order to provide a polyethylene sealant film having great strength and good heat sealability, despite being thin, a multilayer polyethylene sealant film is produced by a method including coextruding and stretching a sealant layer formed of a low density polyethylene resin or linear low density polyethylene resin and an orientation layer including a polyethylene resin having a melting point higher than the sealant layer, by an inflation method at a temperature higher than the melting point of the sealant layer and higher than the Vicat softening temperature, but lower than the melting point of the orientation layer.

5 Claims, No Drawings

POLYETHYLENE SEALANT FILM HAVING HIGH STRENGTH AND PACKAGE USING THE SAME

This application claims priority under 35 U.S.C. § 119 to Japanese Patent Application No. 2015-246099, filed Dec. 17, 2015, the entirety of which is incorporated by reference herein.

BACKGROUND

Field of Endeavor

This disclosure relates to a polyethylene sealant film having high tensile strength properties and excellent resistance to impact breakage, and a package using the same.

Brief Description of the Related Art

Polyethylene sealant films are frequently used as packaging materials, being excellent in strength properties, heat sealability, heat resistance, and cold resistance.

However, while the polyethylene sealant films are excellent in strength properties, the films are broken by excessive impact to damage sealability as a package. A most effective means to impart a sufficient impact resistance is to increase the film thickness, but this is a problem because of increasing cost of the package.

As a measure, it is known to improve the impact resistance by stretching to orient the film. On the other hand, this has a problem of inferiority in heat sealability, and therefore it is difficult to develop the technique for the use as a sealant.

Although various devices have been made in order to improve the impact resistance of polyethylene sealant films as is, they have still problems in being put to practical use.

JP 2004-167956 A discloses a laminate formed of a substrate film and a sealant layer composed of two layers laminated thereto. One of the sealant layer composed of two layers is made of a general linear low density polyethylene resin or a linear low density polyethylene resin produced by the polymerization using a metallocene-based single site catalyst located on the laminating side, and the other is made of a linear low density polyethylene resin produced by the polymerization using a metallocene-based single site catalyst or a general linear low density polyethylene which contacts the contents. The purpose of the laminate is to prevent blocking, and is characterized by providing many convexes on the surface of the sealant layer.

JP 2006-181831 A discloses a multilayer polyethylene sealant film wherein a heat fusion layer made of ethylene-α-olefin random copolymer is laminated onto the adjacent face of a biaxially stretched ethylene polymer film substrate layer. The film is characterized by easy tearability with excellent transparency, shrinkability, heat sealability, and flexing resistance.

SUMMARY

With respect to JP 2004-167956 A, the resins forming the multilayer are a linear low density polyethylene produced by the polymerization using a metallocene-based single site catalyst or a general linear low density polyethylene. Although the linear low density polyethylenes used therein are excellent in transparency and strength properties, such as low temperature heat sealability, they have high adhesion properties to each other. When the film is wound, strong contact (blocking) tends to occur between the front face and back face of the film. Therefore, careful handling is required during the processing of a packaging material.

While, the product of JP 2006-181831 A was devised for the purpose of heat sealability, easy tearability, and easy shrinkability, so-called shrinkable film where opposite properties appear in view of the compatibility of high tensile strength properties and resistance to impact breakage, high rigidity and heat sealability were pursued.

One of numerous aspects of the instant disclosure includes a sealant film having a great strength and good heat sealability even though it is thin.

The inventors herein investigated eagerly in order to solve the above problems, and considered that, when the sealant film is divided into two or more layers and stretched while one is melted and the other is softened, only the softened layer is oriented to increase strength without orientation of the melted layer. As a result, the melted layer may exhibit good heat sealability, and whereas the strength of the oriented layer increases. Thus, the film-forming may be performed smoothly even though it is thin, and the produced film may have good heat sealability.

Then, they further considered that, in order to manufacture such a film, the inflation film-forming method may be the most suitable where partial orientation by stretching is possible while resin is extruded from the die to form a bubble. Still further, they considered that suitable layers constructing the film may have good adhesion to each other in the molten state, and that a suitable resin for the layer to function as the sealant layer may be low density polyethylene or linear low density polyethylene and a suitable resin for the layer being oriented and to function as the support layer may be polyethylene.

The present disclosure was made based on such a consideration

A method of producing a multilayer polyethylene sealant film comprises coextruding and stretching a sealant layer comprising a low density polyethylene resin or linear low density polyethylene resin and an orientation layer comprising a polyethylene resin having a melting point higher than the sealant layer by an inflation method at a temperature higher than the melting point of the sealant layer and higher than the Vicat softening temperature but lower than the melting point of the orientation layer;

In the above-mentioned method of producing a multilayer polyethylene sealant film, the polyethylene resin of the orientation layer can be a low density polyethylene resin or linear low density polyethylene;

In the above-mentioned method of producing a multilayer polyethylene sealant film, the low density polyethylene resin or linear low density polyethylene resin of the sealant layer has a melting point of 90-110° C. and a Vicat softening temperature of 70-105° C. and the polyethylene resin of the orientation layer has a melting point of 120-130° C. and a Vicat softening temperature of 80-120° C.;

In the above-mentioned method of producing a multilayer polyethylene sealant film, the low density polyethylene resin or linear low density polyethylene resin of the sealant layer has an MFR of 0.1-5 g/10 minutes and the polyethylene resin of the orientation layer has an MFR of 0.1-5 g/10 minutes, a molecular weight distribution (Mw/Mn) of 6 or more and a melt tension of 5-15 g;

In the above-mentioned method of producing a multilayer polyethylene sealant film, the blow ratio can be 2-3.5;

In the above-mentioned method of producing a multilayer polyethylene sealant film, the orientation layer comprises two layers, including an outer layer and an intermediate layer, wherein the melting point and Vicat softening temperature of the polyethylene resin of the intermediate layer are lower than the melting point and Vicat softening temperature of the polyethylene resin of the outer layer; and, A coextruded inflation multilayer polyethylene sealant film can be produced by these methods.

Packages can be packaged by a laminate of the coextruded inflation multilayer polyethylene sealant film and a substrate film.

As described herein, sealant films being excellent in strength and heat sealability, even though being thin, can be produced, thereby saving material cost of the sealant, and by rendering the sealant film as the sealant layer of a package, the strength of the package can be improved.

DETAILED DESCRIPTION OF EXEMPLARY EMBODIMENTS

A multilayer sealant film as described herein is produced by coextruding the resin forming the sealant layer and the resin forming the orientation layer and forming into film by an inflation film-forming method.

The resin forming the sealant layer is a low density polyethylene resin or a linear low density polyethylene resin, preferably having an MFR of about 0.1-5 g/10 minutes, more preferably 1-5 g/10 minutes, further more preferably 2-4 g/10 minutes, a melting point of about 90-110° C., preferably about 100-110° C., and a Vicat softening temperature of about 70-105° C., preferably about 90-105° C. Moreover, a resin having a molecular weight distribution (Mw/Mn) of 6 or more is preferred. Particularly preferred resins are linear low density polyethylene produced by using a single site catalyst, especially linear low density polyethylene produced by single step polymerization, as the main component.

The linear low density polyethylene produced by a single site catalyst is characterized by having high tensile strength properties and resistance to impact breakage.

The MFR herein represents "melt flow rate", and in the case of polyethylene, it was measured under the conditions at 190° C. and a load of 21.18 N, according to JIS K 7210.

The molecular weight distribution herein was determined by measuring the number—average molecular weight (Mn) and the weight-average molecular weight by using gel permeation chromatography (GPC), and calculating Mw/Mn.

The resin forming the orientation layer is a polyethylene resin, such as high density polyethylene resin, low density polyethylene resin, or linear low density polyethylene, and is capable of fusing with the resin of the sealant layer. With respect to the properties, preferred resins have an MFR of about 0.1-5 g/10 minutes, preferably about 0.1-0.5 g/10 minutes, more preferably about 0.15-0.3 g/10 minutes, a melting point of about 120-130° C., and a Vicat softening temperature of about 80-120° C., preferably about 100-115° C.

In addition, preferred resins have a molecular weight distribution (Mw/Mn) of 6 or more, and a melt tension of about 5-15 g. Particularly preferred resins are linear low density polyethylene, especially linear low density polyethylene produced by multistep polymerization, as the main component.

The melt tension herein was measured by using a capillary rheometer provided with an orifice having a length of 8 mm, a diameter of 2 mm and an entrance angle of 90 degrees, at 190° C. at a piston descending speed of 10 mm/min. at a winding speed of 10 m/min., and indicated by the necessary load (g) for taking up (JIS K 7119).

The linear low density polyethylene is characterized by relatively narrow molecular weight distribution and composition distribution, high strength, a small amount of elute components which are possible to become a problem in softy and sanitation, and excellent heat sealability. On the other hand, the melt tension of the resin is low due to its narrow molecular weight distribution, and the resin has difficulty balancing between stability in forming a thin film at a high speed and strength properties. In the films described herein, in order to take the balance, it is preferable to use a linear low density polyethylene having a molecular weight distribution of 6 or more and a melt tension of 5-15 g for the orientation layer. The molecular weight distribution of less than 6 or the melt tension of less than 5 g is undesirable, because bursting of the film-forming bubble or rupture of the film in stretching occurs due to insufficient melt tension during upward air cooling (blowing) inflation film-forming or stretching. On the other hand, melt tension exceeding 15 g is also undesirable, because the strength properties of the produced film are insufficient due to, e.g., not only insufficient inflation of the melt bubble but also insufficient orientation by stretching, which are the characteristics of the invention.

It is also preferred to render the orientation layer into 2 or more layers containing an outer layer and an intermediate layer. The intermediate layer mainly improves the strength properties, and the outer layer acts as the laminating face on making a package in addition to strengthening.

In this case, the type, MFR, melting point, and Vicat softening temperature of the resin are chosen from the aforementioned ranges for both the outer layer and the intermediate layer. However, the resin for the outer layer is preferred to have a molecular weight distribution of 6 or more and a melt tension of 5 g or more, preferably 10-15 g, in order to achieve stable film-forming as well as to improve strength properties. The molecular weight distribution of less than 6 or the melt tension of less than 5 g is undesirable, because the burst of a film-forming bubble or rupture in stretching occurs due to insufficient melt tension during upward air cooling (blowing) inflation film-forming or stretching.

It is also preferable to use a polyethylene resin provided with shearing heat history at 180° C. or more as a part of the outer layer. The content of the polyethylene provided with shearing heat history is preferably up to 40% of the polyethylene resin composition of the outer layer.

A linear low density polyethylene will be explained which has been provided with shearing heat history at 180° C. or more and has an MFR of 0.1-5 g/10 minutes. The shearing heat history imparted to the polyethylene is at a temperature of 180° C. or more, preferably 200° C. or more. The upper limit of the temperature is up to 270° C. and preferably up to about 250° C. in practical view point. A suitable shearing rate is about 100-200 sec$^{-1}$. A suitable time for imparting heat history while keeping the above temperature range is about 30-600 seconds, preferably about 60-300 seconds. As the apparatus to impart such a shearing heat history, for example, an extruder for plastics equipped with a kneading screw (the screw may be single shaft or double shaft) can be used. In addition, a Banbury mixer and the like are also preferred. However, the former, which easily makes pellets, is most preferred in view of the convenience of melt kneading in the next process. The number of imparting heat history is usually once, but may be twice or more. In view of commercial production, it is also useful to recycle unused portions, such as that produced by trimming the polyethylene sealant film of the invention, as reprocessed materials.

The resin provided with shearing heat history has oxidized functional groups, such as carbonyl groups which is favorable because the affinity of the adhesive material for lamination is improved on coating in the laminating process.

The effects similar to using the above resin provided with shearing heat history as a part of the outer layer can also be obtained by using a polyethylene which was crosslinked by using an organic peroxide. Namely, the polyethylene obtained by adding 0.05-0.5 part by weight of an organic peroxide to 100 parts by weight of the polyethylene resin constructing a part of the outer layer, followed by providing shearing heat history at 180° C. or more is favorable, because affinity of the adhesive material for lamination is improved on coating in the laminating process due to having oxidized functional groups mainly composed of carbonyl groups. Preferred shearing heat history conditions are similar to the aforementioned.

Representative preferred organic peroxides are t-butyl peroxybenzoate, 2,5-dimethyl-2,5-di (t-butyl peroxy) hexane, and di-t-butyl peroxide. Of the above organic peroxides, preferred ones have a half-life for 1 minute at 100-280° C., particularly preferably at 120-230° C. The organic peroxide may be single or a combination of two types or more. Even though the quantity of the organic peroxide of less than 0.05 part by weight is still preferred, because melt tension still increases as mentioned previously, but a synergistic effect by adding the organic peroxide does not appear. Whereas, the quantity of the organic peroxide exceeding 0.5 part by weight is not preferred, not only because of the aforementioned troubles caused by forming excess crosslinking to increase melt tension, but also dot-shaped foreign matter, called gel or fish eye, is generated.

A preferable melting point relationship between the intermediate layer and the outer layer is the melting point of outer layer≥melting point of intermediate layer. This is because, when heat sealing is conducted in the process of making a packaging bag, since a heating plate heats the bag from the outside, melting point of outer≥layer melting point of intermediate layer is preferred in order to reduce damage to the sealant layer by heat.

Within the range of not remarkably degrading the effects described herein, for the purpose of the improvement in strength, thinning, reduction of calories upon disposing or the like, organic or inorganic fillers may be blended, or other known additives commonly used, such as an antistatic agent, antioxidant, lubricant, antiblocking agent, antifogging agent, organic or inorganic coloring pigment, ultraviolet absorber, or dispersant may be added to each layer as needed.

The preparation method of the compositions for respective layers applied to the multilayer polyethylene sealant films described herein can be listed, but is not limited to, methods of mixing various polyethylene materials by a mixer, such as a mixing roll, Banbury mixer, Henschel mixer, tumbling mixer, or ribbon blender.

The multilayer polyethylene sealant film described herein is produced with stretching in the state that the sealant layer is melted and the orientation layer is softened. As the equipment therefor, inflation film-forming machines are preferred.

The inflation film-forming machine may be any commercial machine capable of extruding two or more layers. Although the cooling is carried out by air cooling or water cooling, air cooling type is preferred, because the inflated film can be gradually cooled to solidify by the cooling air blown into the inside of bubble. In the inflation film-forming machine, the outside of the bubble is advantageous for orientation, because the outside is efficiently cooled directly by the cooling air blown from an air ring. Therefore, it is advantageous to locate the orientation layer on the outside.

The multilayer polyethylene sealant films described herein are characterized by providing the orientation layer with orientation by stretching in order to impart high tensile strength properties and resistance to impact breakage. For example, in the case that the orientation layer is constructed by two layers, with the orientation layer composed of the intermediate layer and the outer layer is provided with orientation at a temperature of the Vicat softening temperature or higher, but lower than the melting point of the polyethylene, being the main component of them, it is essential that the temperature is the melting point or higher than that of the polyethylene being the main component of the sealant layer. That is, with each melting point of the outer layer, the intermediate layer, and the sealant layer indicated by $Tm_1$, $Tm_2$ and $Tm_3$, and each Vicat softening temperature indicated by $Tv_1$, $Tv_2$ and $Tv_3$, respectively, the films described herein are characterized by providing orientation at a temperature of:

$Tv_1$ or more and less than $Tm_1$, and $Tv_2$ or more and less than $Tm_2$, and $Tm_3$ or more (provided that $Tm_1 \geq Tm_2 > Tm_3$ and $Tv_1 \geq Tv_2 > Tv_3$)

The film-forming temperature is preferred, but not limited to, at 140-240° C., measured at a position immediately after being extruded from the exit of a die at the end of the extruder, more preferably at 150-220° C., particularly preferably at 160-210° C. When the melt extrusion temperature exceeds 240° C., thermal degradation of the resin itself and sharp reduction of melt viscosity occur. Moreover, it is possible to render the film-forming bubble unstable. When the melt extrusion temperature is less than 140° C., the melting of polyethylene is insufficient, and it is possible to degrade the appearance by the generation of an unmelted portion. Moreover, since the optimum stretching temperature is reached at a short time in the cooling process, the orientation tends to be insufficient.

The multilayer polyethylene sealant films described herein are characterized by providing orientations by stretching in the direction parallel to film-forming and in the cross direction at a temperature of the Vicat softening temperature or more, but less than the melting point of the polyethylene being the main component of each layer, except the sealant layer on film-forming, in order to exhibit good strength properties, such as resistance to impact breakage. The orientation by stretching on film-forming can be arranged by the blow ratio calculated by the following formula and film-forming speed.

Blow ratio (BUR)=bubble diameter of film /aperture diameter of die

By increasing the blow ratio, the orientation by stretching can be applied mainly in the cross direction to the film-forming. A preferable blow ratio is 2-3.5. Less than 2 is undesirable because the orientation by stretching in the cross direction becomes insufficient. On the other hand, when exceeding 3.5, strength properties increase greatly by the orientation by stretching. However, crystal axes tend to be arranged in a row by stretching, and weak stretching also generates in the sealant layer due to excess stretching. Thus, entangling of polyethylene molecules is in short upon melting, causing a decrease in heat sealability.

On film-forming, the orientation by stretching can be applied mainly in the direction parallel to film-forming by raising the film-forming speed. A preferable film-forming speed is 15-30 m/min. Less than 15 m/min. is undesirable, because the orientation by stretching is insufficient in the film-forming direction. On the other hand, when exceeding 30 m/min., strength properties are greatly increased by orientation by stretching. However, crystal axes tend to be arranged in a row by stretching, and entangling of polyethylene molecules is in short upon melting, causing a decrease in heat sealability. Moreover, cracks are generated, caused by an inability to follow cooling, and the cracks possibly assist the rupture of the film, and therefore exceeding 30 m/min. is undesirable.

The thickness of the sealant layer of the multilayer sealant film thus obtained is about 20-150 μm, commonly about 30-100 μm. The orientation layer may be two or more layers.

For example, in the case that the multilayer sealant film is composed of three layers, i.e., an outer layer, an intermediate layer, and a sealant layer, as to the thickness of each layer, the outer layer is 5-30%, the intermediate layer is 50-80%, and the sealant layer is 5-45% of the total thickness. When the sum of the intermediate layer and the outer layer is less than 55%, expected resistance to impact breakage cannot be obtained. In order to compensate for this, although it is necessary to increase film thickness, it is undesirable because of increasing unnecessary cost. When the sum of the intermediate layer and the outer layer exceeds 95%, the sealant layer is too thin. As a result, a sufficient seal strength cannot be obtained, and therefore, it is undesirable. In the case that the multilayer sealant film is composed of two layers, i.e., the orientation layer and the sealant layer, as to the thickness of each layer, the orientation layer is 55-95%, and the sealant layer is 5-45% of the total thickness. When the orientation layer is less than 55%, expected resistance to impact breakage cannot be obtained. When the orientation layer exceeds 95%, the sealant layer is too thin, and a sufficient heat seal strength is difficult to be obtained.

To the multilayer polyethylene sealant films described herein, high tensile strength properties and resistance to impact breakage can be imparted by applying the orientation by stretching other than to the sealant layer in the cooling to solidify process on melt film-forming. In the films described herein, the orientation degree by the stretching provided in the film-forming was determined by measuring the rate of two-tone color in infrared rays using the polarized infrared method. Actually, it was calculated by using the absorbance of polarized infrared rays at a wave number of 720 cm$^{-1}$ as follows.

That is, the orientation degree D can be determined by:
D∥: absorbance at polarization 0° at 720 cm$^{-1}$
D⊥: absorbance at polarization 90° at 720 cm$^{-1}$ $$D=D\|/D\bot \text{ or } D=D\bot/D\| \text{ (either one of } D\geq 1)\qquad(1)$$

θ: CH2 nocking vibration angle, in the case of polyethylene θ=90°

$$f=\{(D-1)/(D+2)\}\cdot\{2/(3\cos^2\theta-1)\}\qquad(2)$$

It is preferable that the orientation degree f thus obtained is: 0.05<f<0.5

When the orientation degree f is less than 0.05, the orientation is insufficient, and expected resistance to impact breakage cannot be obtained. In order to compensate for this, although it is necessary to increase film thickness, it is undesirable because of increasing unnecessary cost.

On the other hand, when exceeding 0.5, the resistance to impact breakage increases greatly due to excess orientation. As a result, not only is heat sealability lowered, but also tear strength is lowered by the regular arrangement of crystal axes in a row, and therefore it is undesirable. Furthermore, the excess orientation brings great heat shrinkage upon making a package, and therefore it is undesirable in view of the form retention ability.

The above orientation degree is obtained by measuring the orientation of the whole body of the film. The orientation degree of the sealant layer is fundamentally made small to the degree capable of exhibiting good heat sealability, but the orientation degree is not limited to zero.

The multilayer polyethylene sealant films described herein can be used as the packaging film as it is, and also can be utilized as a package by laminating it onto a substrate film or the like. For example, it may be used as a laminate by laminating a substrate film suitable for the purpose of indication of prints, decoration, light shielding, gas barrier, heat insulation, protection of deposit layer, or the like. Specific substrate films are paper, metal foil, deposited or not deposited and stretched or not stretched polyester film, deposited or not deposited and stretched or not stretched polyamide film, deposited or not deposited stretched polypropylene film, foamed film, ethylene-vinyl alcohol copolymer film, and the like. As the laminating method, common dry laminating or extrusion laminating can be applied, and dry laminating is preferred which is commonly used as the lamination method. On that occasion, the multilayer polyethylene sealant films described herein are preferably provided with corona discharge treatment immediately after film-forming. A preferred degree of the corona discharge treatment is at 37-47 dyne/cm by the wet index of the film surface immediately after the treatment.

The heat seal strength of the package produced by heat sealing two sheets of the multilayer polyethylene sealant film, with facing the sealant layers to each other, can be made about 12-20 N/15 mm in width, particularly about 13-16 N/15 mm in width.

EXAMPLES

Used Resins

LLD-1: linear low density polyethylene produced by multistep polymerization (MFR=0.25 g/10 min., Tm=124° C., Tv=103° C., density=0.923 g/cm3, Mw/Mn=10, melt tension=12 g)

LLD-2: linear low density polyethylene produced by multistep polymerization (MFR=0.20 g/10 min., Tm=127° C., Tv=112° C., density=0.931 g/cm$^3$, Mw/Mn=10, melt tension=6 g)

LLD-3: linear low density polyethylene produced by using a single site catalyst
(MFR=2.5 g/10 min., Tm=108° C., Tv=102° C., density=0.921 g/cm$^3$)

LLD-4: linear low density polyethylene produced by using a single site catalyst
(MFR=1.0 g/10 min., Tm=120° C., Tv=88° C., density=0.906 g/cm$^3$, Mw/Mn=3.5, melt tension=4 g)

LLD-5: linear low density polyethylene produced by single step polymerization using Ziegler-Natta catalyst
(MFR=0.9 g/10 min., Tm=124° C., Tv=107° C., density=0.926 g/cm$^3$, Mw/Mn=3.5, melt tension=3 g)

Film-Forming of Sealant Film

Using a three layer air-cooling type inflation film-forming machine equipped with a circular die 300 mm in diameter, and a first extruder for the outer layer having a screw of 55 mm in diameter and L/D of 25, a second extruder for the intermediate layer having a screw of 65 mm in diameter and L/D of 28, and a third extruder having a screw of 55 mm in diameter and L/D of 25, each resin was extruded from their respective dies at an extrusion temperature of 200° C., a blow ratio of 2.7, and a film-forming speed of 23 m/min. to produce a sealant film of 45 μm in thickness.

At that time, the surface temperature of the frost line was measured at four points in the circumferential direction (at intervals of 90 degrees) by a non-contact infrared thermometer, and the mean value was indicated. The frost line is a boundary line where the transparency changes suddenly, and appears when a material extruded from a die is cooled to solidify from the melted state, in the inflation film-forming process. The orientation layer of the film is being oriented by stretching until reaching the frost line, and the diameter of tube-shaped film becomes at maximum there.

In addition, the outer layer side of the produced film was treated with corona discharge so that the wet index became 42-44 dyne/cm.

The film-forming conditions of the films produced in the Examples and Comparative Examples herein are shown in Table 1.

Evaluation of Sealant Film
Orientation Degree

The sample sealant film was set in a Fourier transformed infrared spectrophotometer (manufactured by Shimazu Corporation, "FTIR-8000") provided with a grid polarizer (manufactured by Shimazu Corporation, "GPR-8000"), and the orientation degree f was measured and determined according to the aforementioned calculation method.

Film Strength

The break strength was measured according to JIS K-6922-2. The evaluated results are shown in Table 1.

As can be seen from the Table, in Examples 1-3, where the surface temperature at the maximum diameter portion of the bubble was 118° C., which is higher than the melting point (108° C.) of the sealant layer, lower than the melting point of the outer layer and the intermediate layer of 124° C. and 127° C. being the orientation layer and higher than the Vicat softening temperature of 103° C. and 112° C., the orientation degrees were good at 0.07-0.34 and the break strengths (MD/TD) were also good at 40-42 MPa/33-37 MPa. Whereas, in Comparative Example 1, where the surface temperature at the maximum diameter portion of the bubble was 129° C. which is higher than the melting point of the outer layer and the intermediate layer of 124° C. and 127° C., the orientation degree was 0.02, i.e., the film was almost not oriented. Moreover, the break strength (MD/TD) was not so great at 37 MPa/30 MPa. In addition, in Comparative Example 2, where the linear low density polyethylene having a melting point of 124° C. and a Vicat softening temperature of 107° C. was used for the sealant layer, the orientation degree was very great at 0.40.

Preparation of Package

Using an adhesive for lamination (manufactured by DIC Graphics Co., Ltd., "LX-500"), the laminated film was prepared by laminating by dry lamination in the order of a biaxially stretched polyethylene terephthalate film (manufactured by Toyobo Co., Ltd., "T4100", 12 μm thick), an aluminum foil (manufactured by Toyo Aluminum K. K., "8079", 7 μm thick), a biaxially stretched polyamide film (manufactured by Kohjin Film & Chemicals Co., Ltd., "Bonyl W", 15 μm thick), and the sealant film.

2 sheets of the laminated film were superimposed, and the peripheries were heat-sealed (165° C.×0.2 MPa×1 second) to prepare a bag having an inside dimension of 80×135 mm. 180 ml of water was charged to fill the bag, and the opening portion was heat-sealed under the same conditions as above. The bag was allowed to stand at 5° C. for 24 hours, and the package was evaluated.

Heat Seal Strength of Package

After removing the water from the bag, heat seal test pieces were arbitrarily taken from the heat sealed portion at a width of 15 mm each in the lateral direction and in the longitudinal direction (N=5), and the peel strength of them was measured by using a tensile tester according to JIS-Z 0238.

Falling Body Strength of Package

Ten bags containing water controlled at 5° C. were prepared. A falling body test was conducted using the same bag from a fall of 100 cm to 200 cm (at the maximum) at intervals of 10 cm. At each fall, horizontal fall where landed from a flat area was conducted three times, and vertical fall where landed from a peripheral seal portion was conducted three times. When the bag was not broken, the fall was raised by 10 cm, and the above falling body test was repeated. When the bag was broken, the test was finished at the fall. The fall where all of ten bags were not broken was decided as the falling body strength.

Compression Strength of Package

Ten bags containing water controlled at 5° C. were prepared. One bag was placed vertically on a fixed plate, and areal load was applied from 80 kg to 150 kg at the maximum at intervals of 10 kg onto the upper face of the bag. At each load, in the case that the bag was not broken within 1 minute, the load was increased by 10 kg, and the above test was conducted again. In the case that the bag was broken, the test was finished at the load. The load where all of ten bags were not broken was decided as the compression strength.

The evaluated results are shown in Table 1.

As can be seen from the Table, of the packages using the multilayer sealant films of Examples 1-3, heat seal strength is great, and falling body strength and compression strength are very great. Whereas, of the package using the multilayer sealant film of Comparative Example 1, not only was the heat seal strength weak, but also the falling body strength and compression strength were also weak. In the case of Comparative Example 2, although the resin of the sealant layer is different from Examples 1-3, the heat seal strength is further worse than Comparative Example 1.

In Examples 4-9, although other resins were used for the outer layer or the intermediate layer, each film has appropriate orientation degree and also good heat seal strength.

INDUSTRIAL APPLICABILITY

The multilayer sealant films described herein are excellent in strength and heat sealability, and therefore, can be utilized widely as packaging films and the like as is or as a laminate laminated with other layers.

TABLE 1

Film-forming conditions and various properties

| | Film-forming conditions (resin construction and bubble orientation temp.) | | | | Film evaluation | | Package evaluation | | |
|---|---|---|---|---|---|---|---|---|---|
| | Resin construction (thickness) | | | Stretching surface temp. at max. | Orientation | Break strength | Heat seal | Falling body | Compression |
| | Outer layer (μ) | Intermediate layer (μ) | Sealant layer (μ) | diameter of bubble ° C. | degree — | (MD/TD) MPa | strength N/15 mm | strength Fall cm | Strength kg |
| Ex. 1 | LLD-1(10) | LLD-2(25) | LLD-3(10) | 118 | 0.34 | 42/37 | 16 | 200 or more | 150 or more |
| Ex. 2 | LLD-2(35) | — | LLD-3(10) | 118 | 0.17 | 41/34 | 15 | 200 or more | 150 or more |
| Ex. 3 | LLD-1(35) | — | LLD-3(10) | 118 | 0.07 | 40/33 | 15 | 200 or more | 150 or more |
| C. Ex. 1 | LLD-1(10) | LLD-2(25) | LLD-3(10) | 129 | 0.02 | 37/30 | 12 | 170 | 130 |

TABLE 1-continued

Film-forming conditions and various properties

| | Film-forming conditions (resin construction and bubble orientation temp.) | | | | Film evaluation | | Package evaluation | | |
|---|---|---|---|---|---|---|---|---|---|
| | Resin construction (thickness) | | | Stretching surface temp. at max. | Orientation | Break strength | Heat seal | Falling body | Compression |
| | Outer layer (μ) | Intermediate layer (μ) | Sealant layer (μ) | diameter of bubble ° C. | degree — | (MD/TD) MPa | strength N/15 mm | strength Fall cm | Strength kg |
| C. Ex. 2 | LLD-1(10) | LLD-2(25) | LLD-5(10) | 118 | 0.40 | 40/35 | 10 | 160 | 100 |
| Ex. 4 | LLD-1(10) | LLD-4(25) | LLD-3(10) | 118 | 0.06 | 32/32 | 13 | 140 | 90 |
| Ex. 5 | LLD-1(10) | LLD-5(25) | LLD-3(10) | 118 | 0.08 | 36/30 | 12 | 140 | 100 |
| Ex. 6 | LLD-4(10) | LLD-2(25) | LLD-3(10) | 118 | 0.13 | 38/33 | 15 | 180 | 120 |
| Ex. 7 | LLD-5(10) | LLD-2(25) | LLD-3(10) | 118 | 0.11 | 35/31 | 15 | 180 | 110 |
| Ex. 8 | LLD-4(35) | — | LLD-3(10) | 118 | 0.09 | 36/34 | 13 | 150 | 110 |
| Ex. 9 | LLD-5(35) | — | LLD-3(10) | 118 | 0.15 | 39/38 | 14 | 140 | 100 |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A coextruded inflation multilayer polyethylene sealant film consisting essentially of:
    a sealant layer made of a low density polyethylene resin or a linear low density polyethylene resin having a melting point of 90-110° C. and a Vicat softening temperature of 70-105° C. and being without orientation; and
    an orientation layer made of a polyethylene resin having a melting point of 120-130° C. and a Vicat softening temperature of 80-120° C. and an MFR of 0.1 - 0.5 g/10minutes and is oriented, wherein the polyethylene resin of the orientation layer has a molecular weight distribution Mw/Mn of 6 or more;
    wherein a melting point and a Vicat softening temperature of the sealant layer are lower than those of the orientation layer, respectively;
    wherein the whole body of the film has an orientation degree of 0.05-0.5.

2. A coextruded inflation multilayer polyethylene sealant film as set forth in claim 1, wherein the polyethylene resin of the orientation layer is a low density polyethylene resin or a linear low density polyethylene resin.

3. A coextruded inflation multilayer polyethylene sealant film as set forth in claim 1, wherein:
    the orientation layer comprises an outer layer and an intermediate layer; and
    a melting point and a Vicat softening temperature of the intermediate layer are lower than a melting point and a Vicat softening temperature of the outer layer, respectively.

4. A package comprising:
    a coextruded inflation multilayer polyethylene sealant film as set forth in claim 1; and
    a substrate film laminated to said sealant film.

5. A package as set forth in claim 4, wherein said coextruded inflation multilayer polyethylene sealant film comprises at least two sealant layers, and further comprising:
    a heat seal between said at least two sealant layers, said heat seal having a strength of 12-20 N/15 mm in width.

* * * * *